United States Patent
Hsiao et al.

(10) Patent No.: US 11,360,839 B1
(45) Date of Patent: Jun. 14, 2022

(54) SYSTEMS AND METHODS FOR STORING ERROR DATA FROM A CRASH DUMP IN A COMPUTER SYSTEM

(71) Applicant: Quanta Computer Inc., Taoyuan (TW)

(72) Inventors: Ming-Chih Hsiao, Taoyuan (TW); Chih-Chia Huang, Taoyuan (TW); Tsai-I Yen, Taoyuan (TW); Ting-Yi Su, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/187,207

(22) Filed: Feb. 26, 2021

(51) Int. Cl.
*G06F 11/07* (2006.01)
*G06F 13/42* (2006.01)

(52) U.S. Cl.
CPC ...... *G06F 11/0778* (2013.01); *G06F 11/0772* (2013.01); *G06F 11/0787* (2013.01); *G06F 11/0793* (2013.01); *G06F 13/4282* (2013.01)

(58) Field of Classification Search
CPC ............ G06F 11/0772; G06F 11/0793; G06F 13/4282; G06F 11/0787
USPC ........................................................ 714/45
See application file for complete search history.

(56) References Cited

U.S. PATENT DOCUMENTS

| | | | |
|---|---|---|---|
| 2005/0210077 A1* | 9/2005 | Balakrishnan | G06F 9/545 |
| 2007/0016827 A1* | 1/2007 | Lopez, Jr. | G06F 11/261 |
| | | | 714/31 |
| 2016/0224442 A1* | 8/2016 | Sanghi | G06F 13/4022 |
| 2019/0042348 A1* | 2/2019 | Krithivas | G06F 11/0721 |

FOREIGN PATENT DOCUMENTS

| | | |
|---|---|---|
| CN | 102622322 A | 8/2012 |
| CN | 108563719 A | 9/2018 |
| CN | 111625389 A | 9/2020 |
| TW | 201704929 A | 2/2017 |

OTHER PUBLICATIONS

Wikipedia "IPMB" page, retrieved from https://en.wikipedia.org/wiki/Intelligent_Platform_Managemen_Interface#Baseboard_management_controller (Year: 2022).*
TW Office Action for Application No. 110122675, dated Apr. 25, 2022, w/ First Office Action Summary.
TW Search Report for Application No. 110122675, dated Apr. 25, 2022, w/ First Office Action.

* cited by examiner

*Primary Examiner* — Yair Leibovich
(74) *Attorney, Agent, or Firm* — Nixon Peabody LLP

(57) ABSTRACT

A system and method for logging error data from a central processing unit on a computer system using a dedicated crash dump device, is disclosed. The central processing unit has a management engine. The central processing unit sends an error signal. The dedicated crash dump device is coupled to the central processing unit to receive the error signal. A storage device is coupled to the crash dump device. The crash dump device sends a request to the central processing unit for error data. The crash dump device receives error data from the central processing unit. The crash dump device stores the error data in the storage device.

9 Claims, 5 Drawing Sheets

| Machine Bank0 | | Byte1 Check length | Byte2 Command length | Byte3 Result Rs | Byte4 address | Byte5 NetFn/Lun Checksum1 | Byte6 | Byte7 Rq address | Byte8 Rq Seq/Lun |
|---|---|---|---|---|---|---|---|---|---|
| | | 1 | 2 | 3 | 4 | 5 | 6 | 7 | 8 |
| MCi_CTL | 400 | A5 | 0F | 13 | 2C | B8 | 1C | 84 | 00 |
| MCi_STATUS | 401 | A5 | 0F | 13 | 2C | B8 | 1C | 84 | 00 |
| MCi_ADDR | 402 | A5 | 0F | 13 | 2C | B8 | 1C | 84 | 00 |
| MCi_MISC | 403 | A5 | 0F | 13 | 2C | B8 | 1C | 84 | 00 |
| MCi_CTL2 | 280 | A5 | 0F | 13 | 2C | B8 | 1C | 84 | 00 |

| Byte9 Cmd | Byte10 DATA | Byte11 DATA | Byte12 DATA | Byte13 DATA | Byte14 DATA | Byte15 DATA | Byte16 DATA | Byte17 DATA | Byte18 Check SUm2 | Byte19 | Byte20 |
|---|---|---|---|---|---|---|---|---|---|---|---|
| 9 | 10 | 11 | 12 | 13 | 14 | 15 | 16 | 17 | 18 | 19 | 20 |
| 46 | 57 | 01 | 00 | 00 | 00 | 00 | 04 | 04 | D6 | 00 | 00 |
| 46 | 57 | 01 | 00 | 00 | 00 | 01 | 04 | 04 | D5 | 00 | 00 |
| 46 | 57 | 01 | 00 | 00 | 00 | 02 | 04 | 04 | D4 | 00 | 00 |
| 46 | 57 | 01 | 00 | 00 | 00 | 03 | 04 | 04 | D3 | 00 | 00 |
| 46 | 57 | 01 | 00 | 00 | 00 | 80 | 02 | 04 | 58 | 00 | 00 |

FIG. 4A

| | Byte1<br>Rq address | Byte2<br>NetFn/Lun | Byte3<br>CheckSum1 | Byte4<br>Rs address | Byte5<br>Rq Seq/Lun | Byte6<br>Cmd | Byte7<br>CCODE | Byte8<br>DATA | Byte9<br>DATA | Byte10<br>DATA | Byte11<br>DATA |
|---|---|---|---|---|---|---|---|---|---|---|---|
| | 1 | 2 | 3 | 4 | 5 | 6 | 7 | 8 | 9 | 10 | 11 |
| | 84 | BC | C0 | 2C | 00 | 46 | 00 | 57 | 01 | 00 | ff |
| | 84 | BC | C0 | 2C | 00 | 46 | 00 | 57 | 01 | 00 | 00 |
| | 84 | BC | C0 | 2C | 00 | 46 | 00 | 57 | 01 | 00 | 00 |
| | 84 | BC | C0 | 2C | 00 | 46 | 00 | 57 | 01 | 00 | 00 |
| | 84 | BC | C0 | 2C | 00 | 46 | 00 | 57 | 01 | 00 | 01 |

450

| Byte12<br>DATA | Byte13<br>DATA | Byte14<br>DATA | Byte15<br>DATA | Byte16<br>DATA | Byte17<br>DATA | Byte18<br>DATA | Byte19<br>CheckSum2 | Byte20 |
|---|---|---|---|---|---|---|---|---|
| 12 | 13 | 14 | 15 | 16 | 17 | 18 | 19 | 20 |
| 00 | 00 | 00 | 00 | 00 | 00 | 00 | 37 | 00 |
| 00 | 00 | 00 | 00 | 00 | 00 | 00 | 36 | 00 |
| 00 | 00 | 00 | 00 | 00 | 00 | 00 | 36 | 00 |
| 00 | 00 | 00 | 00 | 00 | 00 | 00 | 36 | 00 |
| 00 | 00 | 00 | 00 | 00 | 00 | 00 | 35 | 00 |

FIG. 4B

SYSTEMS AND METHODS FOR STORING ERROR DATA FROM A CRASH DUMP IN A COMPUTER SYSTEM

TECHNICAL FIELD

The present disclosure relates generally to operating reliability in computing devices. More particularly, aspects of this disclosure relate to a dedicated crash dump hardware circuit that stores error data from a faulty processor in a computer system.

BACKGROUND

Computer systems may perform general computing operations. A typical computer system such as a server generally includes hardware components such as processors, memory devices, network interface cards, power supplies, and other specialized hardware. Computer systems have a basic input/output system (BIOS) that is typically a chip. The BIOS is used to test basic inputs and outputs from the hardware components before booting up the computer system.

A computer system may crash when encountering errors in its central processing unit (CPU). Typically, a central processing unit includes a number of different chips that perform different support functions. For example, in Intel processors, a catastrophic error (CATERR) event signal may be sent when the processor fails. If a faulty processor is present in the computer system, the computer system cannot power on when subsequent power ups are attempted. The computer system thus is not capable of booting normally. Intel processors have a management engine (ME) that collects error data relating to the crash to assist in analysis of the faulty processor.

Complex computer systems, such as servers, use a baseboard management controller to store data on faulty components in a system error log (SEL). FIG. 1 shows a known computer system 10 that includes a central processing unit (CPU) 12 and a baseboard management controller (BMC) 14 in accordance with the Intelligent Platform Management Interface (IPMI) specification. In this example, the CPU 12 may include specific chips such as a platform controller hub (PCH) for specific operations as well as multiple processing cores. In this example, the baseboard management controller 14 may be a complex processor such as, but not limited to, an AST2500 available from ASPEED Technology. The BMC 14 includes interconnections to a bus such as an I2C bus 16 that allows communication with the CPU 12. The BMC 14 also includes a general purpose input/output (GPIO) pin 20 that allows communication of error signals from the CPU 12. The BMC 14 is a service processor monitoring the physical state of the computer system 10 and generally includes support for advanced functionality. For example, the BMC 14 includes support for keyboard, video, mouse (KVM), a network interface for a management network, and internal memory for storing operational data such as a system error log.

However, there may be certain computer systems such as a network switch that do not have a baseboard management controller. In addition, many users desire computer systems without a baseboard management controller. For example, incorporating a BMC in a computer system requires specialized knowledge and protocols for the Intelligent Platform Management Interface (IPMI) standard for writing firmware for the rest of the system. Further BMCs are essentially separate processor units that add to the overall expense of a computer system. In certain circumstances, BMCs constitute a security risk, as operational data may be accessed through the BMC. However, without the BMC, error recording from CPU failures is not possible and thus computer systems without a BMC suffer from the inability to analyze errors that occur in the CPU. This increases downtime as a technician must spend time and resources to determine the cause of the CPU failure.

Thus, there is a need for a dedicated hardware circuit for a computer system that allows error recording by disabling components automatically that prevent power up of the computer system. There is a further need for a simple component for error logging that eliminates the need for a complex baseboard management controller. There is a further need for a component that allows system management functions to be consolidated into a single processor.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a computer system including a central processing unit operable to send an error signal. The central processing unit has a management engine that is configured to collect error data. A dedicated crash dump device is coupled to the central processing unit to receive the error signal. A storage device is coupled to the crash dump device. The crash dump device is configured to send a request for error data to the central processing unit, receive error data from the central processing unit in response to the request, and store the error data in the storage device.

A further implementation of the example system is an embodiment where the computer system is a server. Another implementation is where the crash dump device is a programmable device. Another implementation is where the crash dump device is one of a complex programmable logic device, a field programmable gate array, or a programmable micro-controller integrated circuit. Another implementation is where the system includes a bus coupled to the storage device, central processing unit and crash dump circuit. Another implementation is where the storage device is configured to store instructions for the crash dump device to send the request in a predetermined protocol and receive the error data in the predetermined protocol on the bus. Another implementation is where the bus is an I2C bus and the predetermined protocol is the IPMB protocol. Another implementation is where the storage device is an electrically erasable programmable read only memory (EEPROM). Another implementation is where the crash dump device includes a general purpose input output pin that is configured to receive the error signal from the central processing unit.

Another disclosed example is a method of logging error data from a central processing unit on a computer system. An error signal is sent from the central processing unit. The error signal is received via a dedicated crash dump device coupled to the central processing unit. A request for error data is sent to the central processing unit via the crash dump device. The error data is received from the central processing unit. The received error data is stored in a storage device coupled to the crash dump device.

Another implementation of the example method is where computer system is a server. Another implementation is where the crash dump device is a programmable device. Another implementation is where the crash dump device is one of a complex programmable logic device, a field programmable gate array, or a programmable micro-controller integrated circuit. Another implementation is where the request is sent on a bus coupled to the storage device, central processing unit and crash dump circuit. Another implementation is where the storage device stores instructions for the crash dump circuit to send the request in a predetermined protocol and receive the error data in the predetermined protocol on the bus. Another implementation is where the bus is an I2C bus and the predetermined protocol is the IPMB protocol. Another implementation is where the storage device is an electrically erasable programmable read only memory (EEPROM). Another implementation is where the crash dump device includes a general purpose input output pin that receives the error signal from the central processing unit.

Another disclosed example is a dedicated crash dump hardware device including a general purpose input output pin configured to receive an error signal from a central processing unit. The hardware device includes a bus interface in communication with a bus coupled to the central processing unit and a storage device. The device includes a crash dump circuit operable to send a request to the central processing unit in response to receiving the error signal on the bus interface. The crash dump circuit is operable to receive error data from the central processing unit via the bus interface. The crash dump circuit is operable to store the error data in the storage device via the bus.

BRIEF DESCRIPTION OF THE DRAWINGS

The disclosure will be better understood from the following description of exemplary embodiments together with reference to the accompanying drawings, in which:

FIG. 4A is a diagram of the request message from the dedicated crash dump hardware device;

FIG. 4B is a diagram of the response message from the CPU; and

Figure 1:
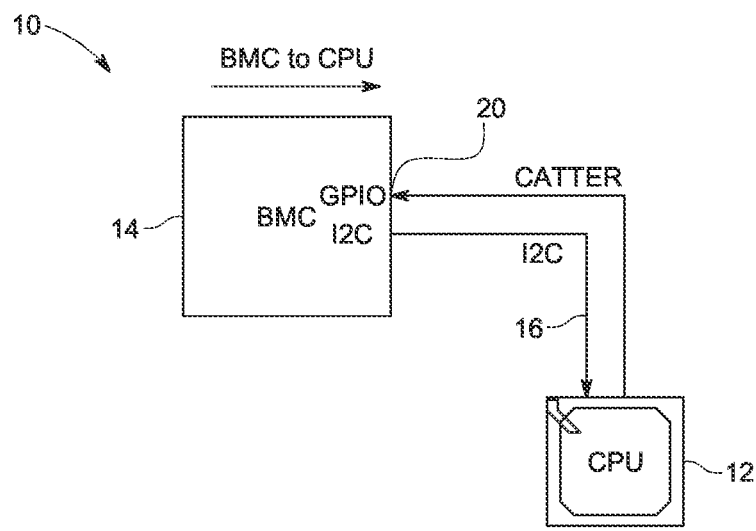
FIG. 1 is a block diagram of a prior art system that uses a baseboard management controller for error logging.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a computer system that eliminates the need for a management controller to perform a crash dump function recording error data relating to a central processing unit. A specific dedicated crash dump hardware device and non-volatile memory is provided for error logging functions. The remaining system monitoring operations of a baseboard management controller may therefore be performed by the central processing unit, thus eliminating the need for a baseboard management controller.

Figure 2:
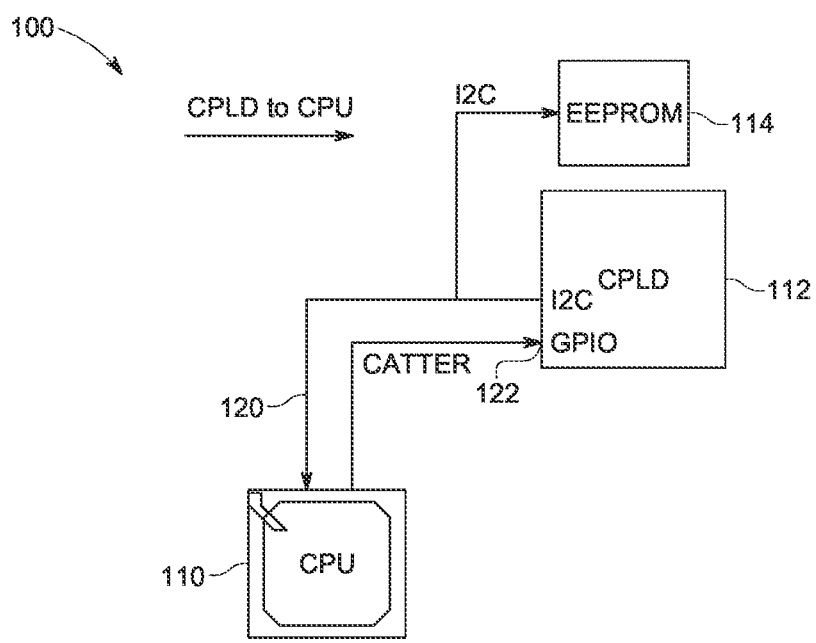
FIG. 2 is a block diagram of a computer system that uses an example dedicated crash dump hardware device for error logging from a CPU.

FIG. 2 is a block diagram of the components of a computer system 100 that allows error logging through a dedicated crash dump hardware circuit. The computer system 100 has a central processing unit (CPU) 110 that may include specific chips such as a platform controller hub for specific operations as well as multiple processing cores. The CPU 110 also includes a management engine (ME) that provides model specific register (MSR) error data in relation to errors that result in the malfunction of the CPU 110. A dedicated crash dump hardware device 112 is provided to handle error reporting. A storage device 114 allows the storage of error data from the CPU 110. In this example, a bus 120 such as, but not limited to, an inter-integrated circuit (I2C) bus allows communication of messages according to a predetermined protocol between the CPU 110, the crash dump hardware device 112, and the storage device 114. The crash dump hardware device 112 includes circuitry to perform a crash dump function, a bus interface that is coupled to the bus 120, and a general purpose input output (GPIO) pin 122 that is coupled to a line to receive signals from the CPU 110. One example of such a signal is a catastrophic error (CATERR) event signal according to the Intel x86 standard generated by the CPU 110 when the CPU 110 malfunctions.

The computer system 100 may also include dual in line memory modules (DIMM)s to provide additional memory to support the CPU 110. Specialized functions may be performed by specialized processors such as a GPU or a field programmable gate array (FPGA) mounted on a motherboard or on an expansion card. The computer system 100 may also include additional hardware components such as, but not limited to, a NIC (Network Interface Card), redundant array of inexpensive disks (RAID) cards, field programmable gate array (FPGA) cards, power supply units (PSU), hard disk drives (HDD), solid state drives (SSD), dual in-line memory modules (DIMM), central processing units (CPU), and graphic processing units (GPU).

In this example, the crash dump hardware device 112 may be a dedicated circuit device such as a complex programmable logic device (CPLD), an application specific integrated circuit (ASIC), a field programmable gate array (FPGA), or any programmable micro-controller integrated circuit that implements a crash dump function. In this example, the crash dump hardware device is a MAX10. In this example, the crash dump hardware device 112 may be programmable through instructions stored in the storage device 114. If the crash dump hardware device 112 is a dedicated specialized circuit such as an ASIC, the functions are designed in the hardware itself. If the crash dump hardware device 112 includes programmable hardware such as a CPLD or an FPGA, the device hardware may be programmed before installation in the computer system 100. In this example, the storage device 114 is a separate component such as an electrically erasable programmable read only memory (EEPROM), but other suitable non-volatile memory devices may be used. Alternatively, the storage device 114 may be built into the hardware device 112.

In this example, the crash dump hardware device 112 receives error signals from the CPU 110 through the GPIO pin 122. The crash dump hardware device 112 performs the crash dump function by requesting and receiving error data from the CPU 110 via the bus 120. The crash dump hardware device 112 moves the error data to the storage device 114 for storage via the bus 120. The specialized crash dump hardware device 112 and storage device 114 allow error data storage without requiring a complex management controller such as a BMC. A technician may read CPU model specific registers through accessing the hardware device 112 and thus the stored data on the storage device 114. In addition, the data stored on the EEPROM storage device 114 may be read through the I2C bus 120. This data may include an analysis error message and other data in the model specific registers defined by the CPU model through the management engine.

In the normal operational state, the crash dump hardware device 112 always detects whether an error signal is present on the GPIO pin 122. When the crash dump hardware device 112 detects the error signal on the GPIO pin 122, the crash dump function is enabled. The crash dump hardware device 112 will query the management engine of the CPU 110 for all of the data from the model specific registers. The query or demand instructions for the crash dump hardware circuit are stored in the storage device 114 for receiving error data through the bus 120 using a data communication protocol such as the Intelligent Platform Management Bus (IPMB) protocol.

Figure 3:
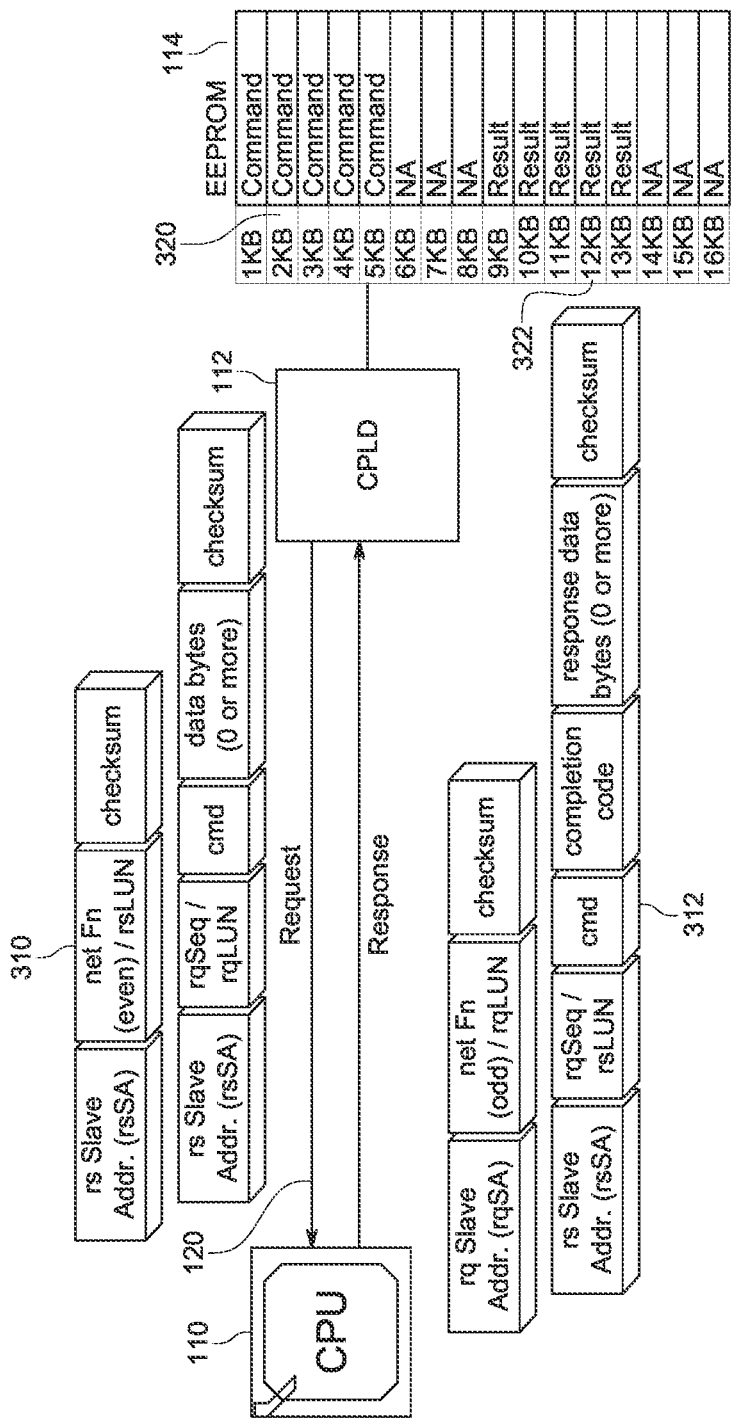
FIG. 3 is a detailed diagram of the request and response between the dedicated crash dump hardware device and the CPU in FIG. 2 for error logging.

FIG. 3 shows a block diagram of the demand and response when the crash dump function is enabled by the hardware device 112 through receiving a CATERR signal from the CPU 110. When the crash dump function is enabled by the crash dump hardware device 112, a demand message 310 is sent over the bus 120 to the CPU 110. The error data is then returned in a response message 312 sent over the bus 120 to the crash dump hardware device 112.

As explained above, the memory blocks of the storage device 114 are allocated to store instructions or for storing data. In this example, the storage device 114 includes a set of instruction blocks 320 that include instructions for a predetermined communication protocol, such as IPMB, that enables the crash dump hardware device 112 to make requests and receive responses from the CPU over the bus 120. The storage device 114 also includes a series of data result blocks 322 that store the received error data. A technician may review the stored error data from the data result blocks 322 to analyze the cause of the CPU crash. For example, instruction blocks 320 may store a 4 KB crash dump command, while the data result blocks 322 store 4 KB CPU MSR (model specific registers) register data.

In this example, the instructions for the IPMB protocol are burned into the storage device 114 in advance. The storage device 114 and the crash dump hardware device 112 are then installed in the computer system 100. When the hardware device 112 receives an error signal from the CPU 110 through the GPIO pin 122, the crash dump function is executed by the dedicated circuits of the crash dump hardware device 112.

In this example, the crash dump hardware device 112 uses a request command 400 shown in FIG. 4A that is sent to the management engine of the CPU 110 in IPMB format through the bus 120 in FIG. 3. In this example, the request command has a machine bank of five 20 byte sections for registers 400, 400, 401, 402, 403 labeled for machine control (MCi_CTL), machine status (MCi-STATUS), machine address (MCi_ADDR), machine miscellaneous (MCi_MISC), and another machine control (MCi_CTL2). The total size of the request command 400 is the command quantity multiplied by the command size. For example, the command quantity of 200 by a 20 byte size results in a 4 KB request size.

As shown in FIG. 4A, the request command 400 includes byte 1, which is the slave (Rs) address; byte 2, which is the functions to be accessed and logic unit number (netfn/Lun); byte 3, which is a first checksum; byte 4, which is the requester (Rq) address; byte 5, which is a response sequence and logic unit number (Rq Seq/Lun); byte 6, which is the command (cmd) byte; and byte 15, which is a second checksum. The bytes 7-14 store a data payload, which is the request command in this example.

FIG. 4B shows a response 450 that is sent from the CPU 110 to the crash dump hardware device 112 in FIG. 3. The response 450 is in IPMB format and thus may be read according to the instructions to the crash dump hardware device 112. In this example, the response 450 has five 20 byte sections. The response 450 includes byte 1, which is the requester (Rq) address; byte 2, which is the functions to be accessed and logic unit number (netfn/Lun); byte 3, which is a first checksum; byte 4, which is the slave (Rs) address; byte 5, which is a response sequence and logic unit number (Rq Seq/Lun); byte 6, which is the command (cmd) byte; byte 7, which is the error check (CCODE); and byte 19, which is a second checksum. The bytes 8-18 store a data payload, which is the error data from the management engine of the CPU 110 in this example.

After receiving the response 450, the crash dump hardware device 112 reads the data from the CPU 110 (e.g., data from the model specific registers) and stores the error data to the storage device 114. A technician can read all error data in the IPMB format from the storage device 114. Using a comparison tool on the error data, a technician may quickly determine the error causing the CPU 110 to malfunction.

Figure 5:
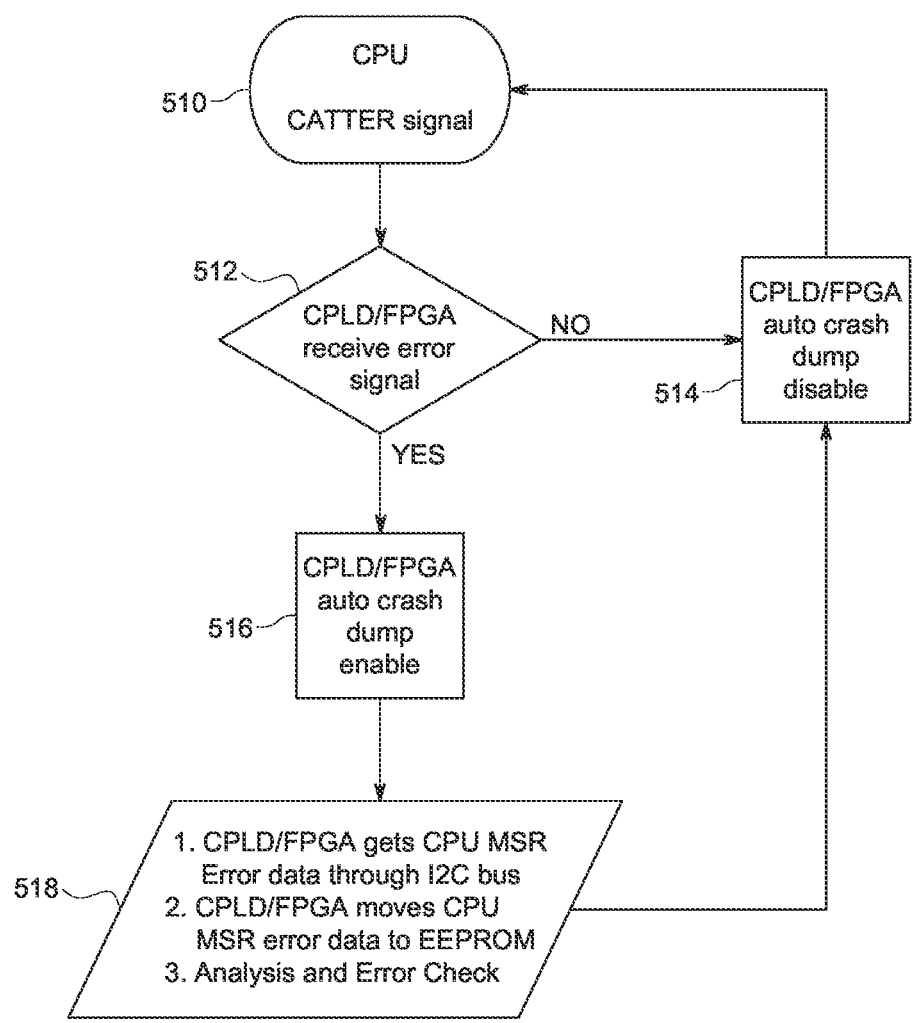
FIG. 5 is a flow diagram of the process of error logging performed by the example dedicated crash dump hardware device in FIG. 2.

FIG. 5 shows a flow diagram of the general process of handing error signals through the specialized crash dump hardware device 112 in FIG. 2. When an error occurs on the CPU 110, an error signal, such as a CATERR event signal, is sent to the GPIO pin 122 (510). The routine determines if an error signal is received through the GPIO pin 122 (512). If the error signal is not received, the auto crash dump function remains disabled (514). If error signal is received, the crash dump function of the crash dump hardware device 112 is enabled (516). The crash dump hardware device 112 will then send an IPMB demand command over the bus 120.

When the CPU 110 receives the IPMB demand command over the bus 120, the CPU 110 sends the relevant code error data back to the crash dump hardware device 112 (518). The crash dump hardware device 112 will use the bus 120 to store the error data in the storage device 114. Thus, a technician may read the data from the storage device 114 to determine CPU error messages and error types. This data assists in resolving the issues causing the CPU crash. After the error messages are stored in the storage device 114, the auto crash dump function is disabled (514).

The flow diagram in FIG. 5 is representative of example machine-readable instructions for the hardware device 112 in FIG. 2 to perform error detection and logging. In this example, the machine-readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces can be implemented by software, hardware, and/or firmware. Also, some or all of the machine-readable instructions represented by the flowcharts may be implemented manually. Further, although the example algorithm is described with reference to the flowchart illustrated in FIG. 5, persons of ordinary skill in the art will readily appreciate that many other methods of implementing the example machine-readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A computer system allowing recording of central processor error signals without a baseboard management controller, the system comprising:
   a central processing unit operable to send an error signal, the central processing unit including a management engine configured to collect error data;
   a dedicated crash dump complex programmable logic device coupled to the central processing unit and configured to receive the error signal;
   an I2C bus coupled to the central processing unit and the dedicated crash dump complex programmable log device; and
   a storage device coupled to the dedicated crash dump complex programmable logic device and the I2C bus, wherein the dedicated crash dump complex programmable logic device is solely configured to:
      send a request for the error data to the central processing unit in a predetermined Intelligent Platform Management Bus (IPMB) protocol;
      receive the error data from the central processing unit on the I2C bus in response to the request in the predetermined IPMB protocol; and
      store the error data in the storage device.

2. The computer system of claim 1, wherein the computer system is a server.

3. The computer system of claim 1, wherein the storage device is an electrically erasable programmable read only memory (EEPROM).

4. The computer system of claim 1, wherein the crash dump device includes a general purpose input output (GPIO) pin configured to receive the error signal from the central processing unit.

5. A method of logging error data from a central processing unit on a computer system without using a baseboard management controller, the method comprising:
- sending an error signal from the central processing unit;
- receiving the error signal via a dedicated crash dump complex programmable logic device coupled to the central processing unit;
- sending a request for the error data to the central processing unit via the dedicated crash dump complex programmable logic device in a predetermined Intelligent Platform Management Bus (IPMB) protocol;
- receiving the error data from the central processing unit on an I2C bus coupled to the central processing unit and the dedicated crash dump complex programmable log device;
- storing the received error data in a storage device coupled to the dedicated crash dump complex programmable logic device, wherein the dedicated crash dump complex programmable device is solely configured to perform receiving error signal, sending the request for the error data, receiving the error data and storing the received error data.

6. The method of claim 5, wherein the computer system is a server.

7. The method of claim 5, wherein the storage device is an electrically erasable programmable read only memory (EEPROM).

8. The method of claim 5, wherein the crash dump device includes a general purpose input output (GPIO) pin configured to receive the error signal from the central processing unit.

9. A dedicated crash dump hardware complex programmable logic device for eliminating use of a baseboard management controller for logging central processing errors in a computer system, the dedicated crash dump complex programmable logic device comprising:
- a general purpose input output (GPIO) pin configured to receive an error signal from a central processing unit;
- a bus interface in communication with an I2C bus coupled to the central processing unit and a storage device; and
- a crash dump circuit solely operable to:
  - send a request to the central processing unit in a predetermined Intelligent Platform Management Bus (IPMB) protocol in response to receiving the error signal on the bus interface;
  - receive error data from the central processing unit via the bus interface in response to the request in the predetermined IPMB protocol; and
  - store the error data in the storage device via the I2C bus.

* * * * *